J. A. KEISTER.
VALVE.
APPLICATION FILED AUG. 25, 1917.
1,289,474.
Patented Dec. 31, 1918.
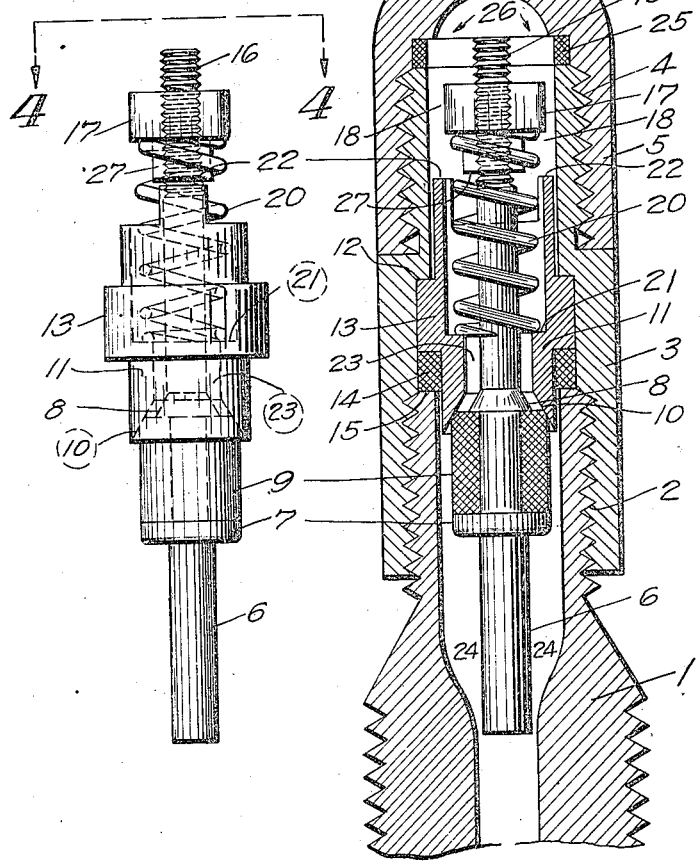
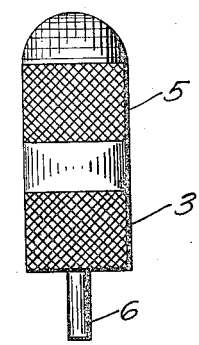
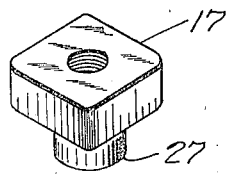
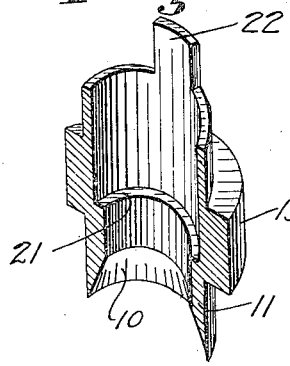
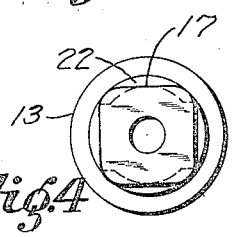
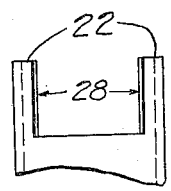
Inventor:
John A. Keister,
By Hugh K. Wagner
Attorney

UNITED STATES PATENT OFFICE.

JOHN A. KEISTER, OF ST. LOUIS, MISSOURI.

VALVE.

1,289,474. Specification of Letters Patent. Patented Dec. 31, 1918.

Application filed August 25, 1917. Serial No. 188,122.

*To all whom it may concern:*

Be it known that I, JOHN A. KEISTER, a citizen of the United States, residing at the city of St. Louis, in the State of Missouri, have invented certain new and useful Improvements in Valves, of which the following is a specification.

This invention relates to valves and particularly valves for tires, and it contemplates the provision of an improved and cheapened structure of this nature so constructed that it may readily be applied to or removed from valve-receiving tubes of standard construction and when in place will permit the introduction or release of air therethrough in a rapid way.

In the accompanying drawings forming part of this specification and in which like numbers of reference denote like parts wherever they occur, Figure 1 is a longitudinal sectional view of this improved valve in place in the usual valve-receiving tube of an automobile tire and with protecting cap for the valve in proper position;

Fig. 2 is a side elevation of the valve casing and cap and part of the valve-tube;

Fig. 3 is a vertical elevation on an enlarged scale of the valve casing and part of the valve-tube and nut;

Fig. 4 is a plan view on the line 4—4 in Fig. 3;

Fig. 5 is a perspective view showing the interior of the valve casing, but with the valve-tube absent;

Fig. 6 is a detail of the check-nut; and

Fig. 7 is a detail showing the enlarged air-inlet.

From the tire (not shown in the drawings, but of any ordinary or desired construction) or any chamber protrudes the usual valve-receiving tube 1, which is exteriorly threaded at 2 for reception of the interiorly screw-threaded body 3 of this invention.

The end of the body 3 away from the tube 1 is reduced in diameter and exteriorly screw-threaded at 4 to receive the interiorly threaded cap 5.

The body 3 is hollow, for the passage of air or other fluid, for the introduction of which into the interior of the tire or other container the cap 5 must first be removed.

Within the passage through the body 3 is located the valve-stem 6 bearing the valve collar 7, between which and the shoulder 8 is located, held, and borne the resilient collar or gasket 9, which seats as a valve on the valve-seat 10. The resilient collar or gasket 9 preferably impinges at an angular corner thereof about midway between the edges of the valve-seat 10, and the said valve-seat is preferably at an angle of about sixty degrees to the horizontal. By arrangement at the said angle and by the said arrangement whereby the angular end of the gasket 9 bears at the point stated on the said valve-seat, a beneficial result is obtained by reason of the gasket 9 being "upset" as shown in Fig. 1 at the point of engagement with valve-seat 10, thus forming the tightest and most complete engagement with the valve-seat 10. The said gasket 9 is firmly held in place by the valve collar 7 of approximately the same diameter, and at its other end is prevented from any longitudinal movement by the shoulder 8, preferably of less diameter than the gasket 9.

The valve-seat 10 is formed on the inside of the inner end of a hollow cylinder 11 located within the body or casing 3, which casing is reduced at its forward end and formed with the shoulder 12, against which engages the collar 13 connected to or formed integral with the cylinder 11. That portion of the valve seat member or cylinder which extends above the shoulder 12 is slightly smaller in diameter than the inner diameter of the surrounding body 3 to form an annular space into which the dirt, and other foreign matter which usually accompanies the operation of inflating a tire, may drop. This provision maintains a clear passage for the air between the upstanding lugs 22, hereinafter referred to, and should the annular space, after long usage, fill, it may readily be cleaned by removing the body 3.

The cylinder 11 is prevented from movement outwardly by engagement by collar 13 with shoulder 12 and is inhibited from movement in an inward direction by contact with gasket 14, which is located between the collar 13 and the wall 15 of the mouth of tube 1.

The valve-stem 6 extends through the hollow cylinder 11 to the mouth thereof and is threaded at 16 to receive the internally-threaded polygonal nut 17, which is adapted to move back and forth in the chamber 18 in the forward end of casing 3. The inner side of the nut 17 impinges against the spring 20, the other end of the said spring 20 abutting upon shoulder 21.

Quick opening of the valve results from this construction and arrangement, because the fluid under pressure that is to pass through the said valve first strikes the outside of the nut 17 and because of its considerable area presses the same and the valve-stem 6 bearing the same inwardly far enough to open the valve wide enough at valve-seat 10 to afford the readiest access of air to the interior of the tube or chamber. The striking of the nut 17 on the lug or lugs 22 acts as a check to prevent undue compression of spring 20, tending to weaken the said spring. The large bore through cylinder 11 and the large air-passage 23 opening out into the large air-chamber 24 in the mouth of tube 1 affords ready and quick ingress and egress for the air or other fluid to be controlled by the valve, while air readily passes around nut 17 in air-chamber 18.

Wear of gasket 9 or weakening of spring 20 can be compensated for by adjustment of nut 17 on valve-stem 6. Gasket 25 insures a tight joint between the outer extremity of casing 3 and cap 5.

In practice it has been found that this construction, with the permitted wide opening at valve-seat 10 by the thrusting away therefrom of the gasket 9, allows much more rapid inflation or deflation of a tire than with valves heretofore commonly in use. Motorists frequently find it necessary to deflate tires, and in so doing must either tediously hold pressure upon a valve to keep it open until all the air has escaped or with difficulty remove the "center" of the valve. In the use of the present invention, however, this can be accomplished in the quickest and easiest manner possible by unscrewing the body 3 from the tube 1, which allows all the air rapidly to exhaust through tube 1. The small valve parts are not disturbed when body 3 is thus removed, because they are taken off with it even while cap 5 remains in place.

This shows, also, the facility with which these valves as a whole may be applied to any ordinary valve receiving tube not having a valve in it, as such parts are made of standard sizes, and these valves are applied by merely screwing body 3 upon tube 1.

The wearing out of a spring like spring 20 in other constructions by undue pressure (which undue pressure is prevented by the check construction provided by the construction herein shown and described) renders a valve inefficient, as it allows bubbling of air through the valve and makes it unable to hold air under light pressure, as when tires have been partially inflated for shipment.

The outermost end of valve-stem 6 (i. e., the threaded part 16) projects slightly beyond the polygonal nut 17 and is adapted to open the valve in the usual air supply pipes at filling stations. The end 16 may, as shown in the drawings (Fig. 1), enter a central hole 26 in gasket 25.

It will be observed that the function of spring 20 is chiefly to keep the valve closed while there is no air within the tire or while the pressure therein is so slight as not to seat the gasket 9 firmly on the valve-seat 10. From this and the fact that compression of spring 20 is checked as hereinabove described, it results that the said spring receives comparatively little wear, and for practical purposes is as indestructible as the other elements of this construction. Where a pump is used for tire inflation, each pulsation of the pump depresses the spring in tire valves now in common use until such spring is flat, and inflation by compressed air also flattens such spring; but the impingement in the present invention of nut 17 on lug or lugs 22 prevents undue compression of spring 20, and the pressure thereon can be regulated and adjusted by means of rotation of nut 17 on threads 16.

It will furthermore be perceived that, unlike the valve in most common use at the present time and for many years past for the use herein contemplated in connection with tires (in which the air pressure constantly tends to weaken the spring, and in which the spring is a necessity to keep the valve closed), this valve seats tighter the greater the air pressure.

The valve of this invention provides a triple seal to prevent the exit of air, namely, at valve-seat 10 and at gasket 14 and at gasket 25.

The reduced sleeve 27 on the inner side of nut 17 is encircled by the spring 20.

The projection of the lugs 22 leaves a pair of large passages 28 for the passage of air.

The nut 17 being square has about double the area of the nut that can be used in the construction depicted in this inventor's application for patent filed May 12, 1917, Serial No. 168,103, which produces a quicker-acting valve. This quickness of action is also enhanced by the enlarged area of the air inlet to the interior of the hollow cylinder 3 as compared to the air inlet in the construction of the said application and other earlier valves. A further advantage of the valve herein shown and described over that of the above-mentioned application is that in the nipples on the air-hose at some air-filling stations projections engage the extremity of the cylinder like the cylinder 3 of this invention before the end of the valve-stem has been depressed to the bottom of the slots, whereas in the construction herein shown and described, the cylinder 3 is relatively shorter (its extremity about matching the bottom of the slots in the earlier construction), and any projection upon the air-nipple engages and presses upon nut 17, thereby positively depressing the same to the point of contact with lugs 22. If there be no such projection upon the air-nipple, nut 17 will be thus depressed by the pressure of the compressed air entering in the usual manner.

Having thus described this invention, I hereby reserve the benefit of all changes in form, arrangement, order, or use of parts, as it is evident that many minor changes may be made without departing from the spirit of this invention.

I claim:

In a valve, a tubular body internally screw-threaded at one end for engagement with the stem of a tire and provided with an internal shoulder opposing the upper end of said stem, said body extending outwardly in tubular form beyond the shoulder, a valve seat member provided with an external shoulder between its ends to be clamped between said first shoulder and the opposing end of the tire stem, the inner end of said valve seat member providing a valve seat and the outer end being of smaller diameter than the inner diameter of the surrounding portion of the body whereby to provide an annular space, said outer end of the valve seat member also having spaced outwardly extending lugs, a valve member engaging the seat of the valve seat member and provided with a stem extending through the latter, a nut threaded on the outer end of the valve stem and engageable with the lugs for limiting the unseating movement of the valve member, and a spring encircling the valve stem and bearing outwardly on the nut to normally hold the valve member seated.

In testimony whereof I hereunto affix my signature.

JOHN A. KEISTER.

Copies of this patent may be obtained for five cents each, by addressing the "Commissioner of Patents, Washington, D. C."